L. G. FISCHER.
ROTARY ENGINE.
APPLICATION FILED JUNE 13, 1918.

1,311,858.

Patented July 29, 1919.
5 SHEETS—SHEET 1.

Inventor
Louis G. Fischer,
by Edmund W. Perry
Atty.

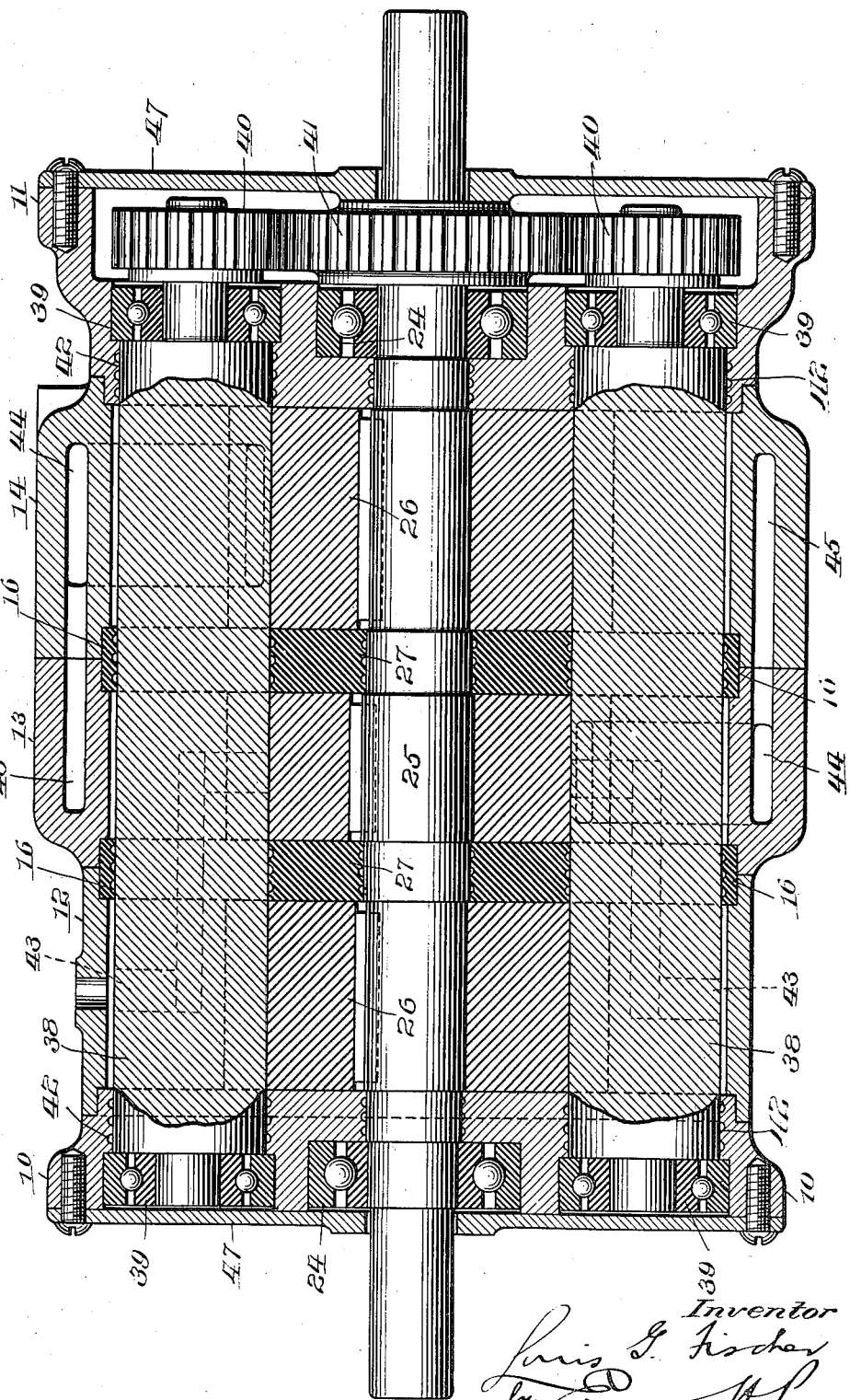

L. G. FISCHER.
ROTARY ENGINE.
APPLICATION FILED JUNE 13, 1918.
1,311,858.
Patented July 29, 1919.
5 SHEETS—SHEET 3.
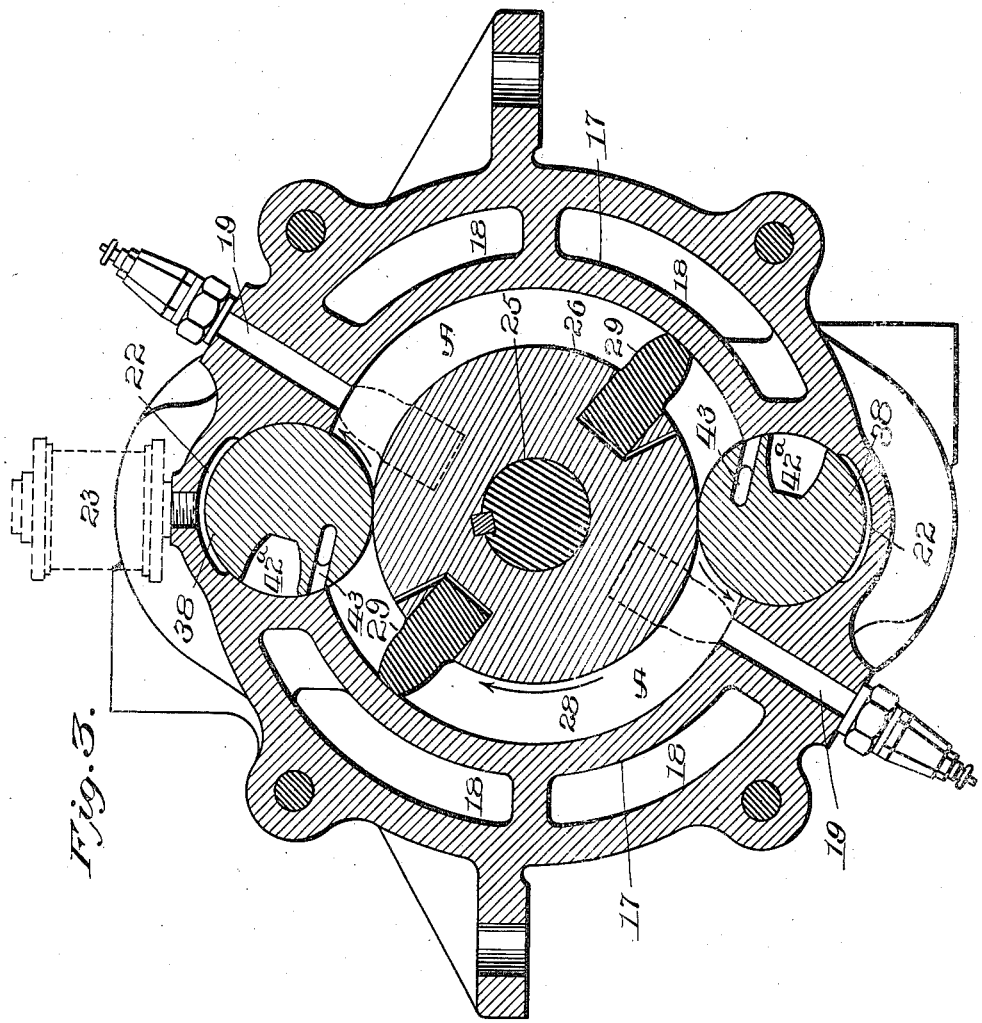

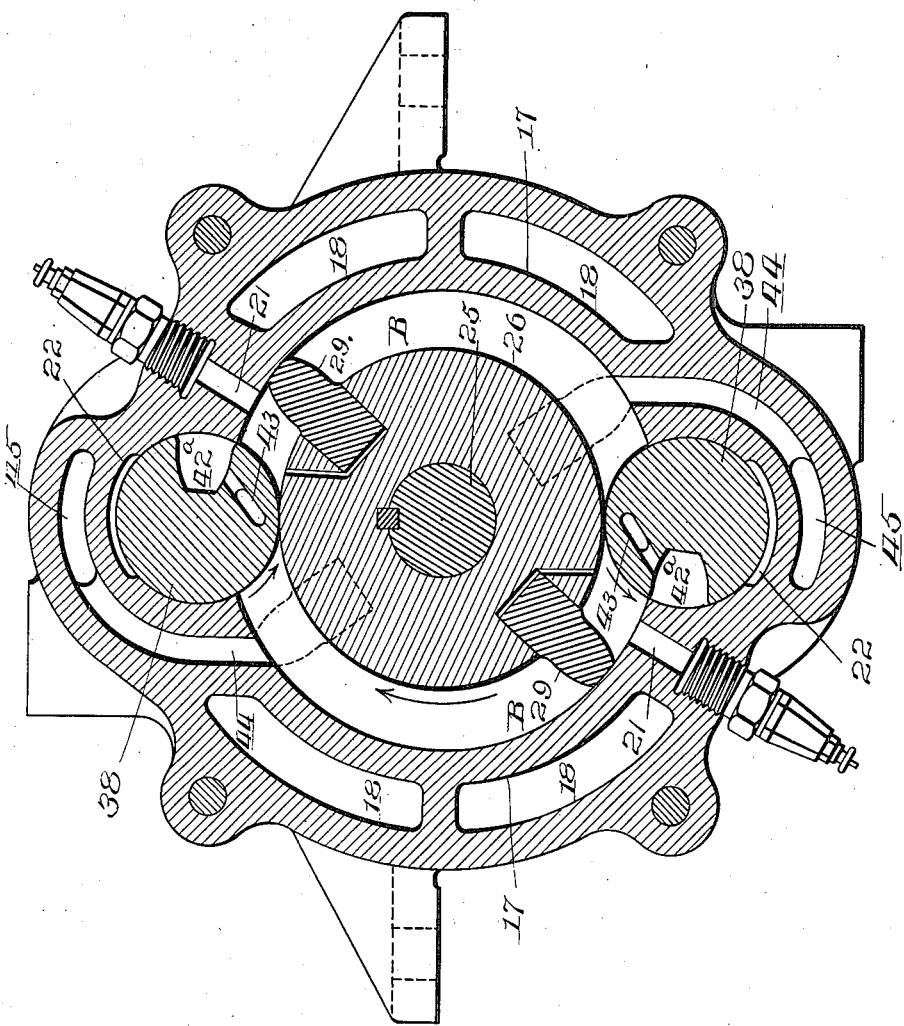

L. G. FISCHER.
ROTARY ENGINE.
APPLICATION FILED JUNE 13, 1918.
1,311,858.
Patented July 29, 1919.
5 SHEETS—SHEET 5.
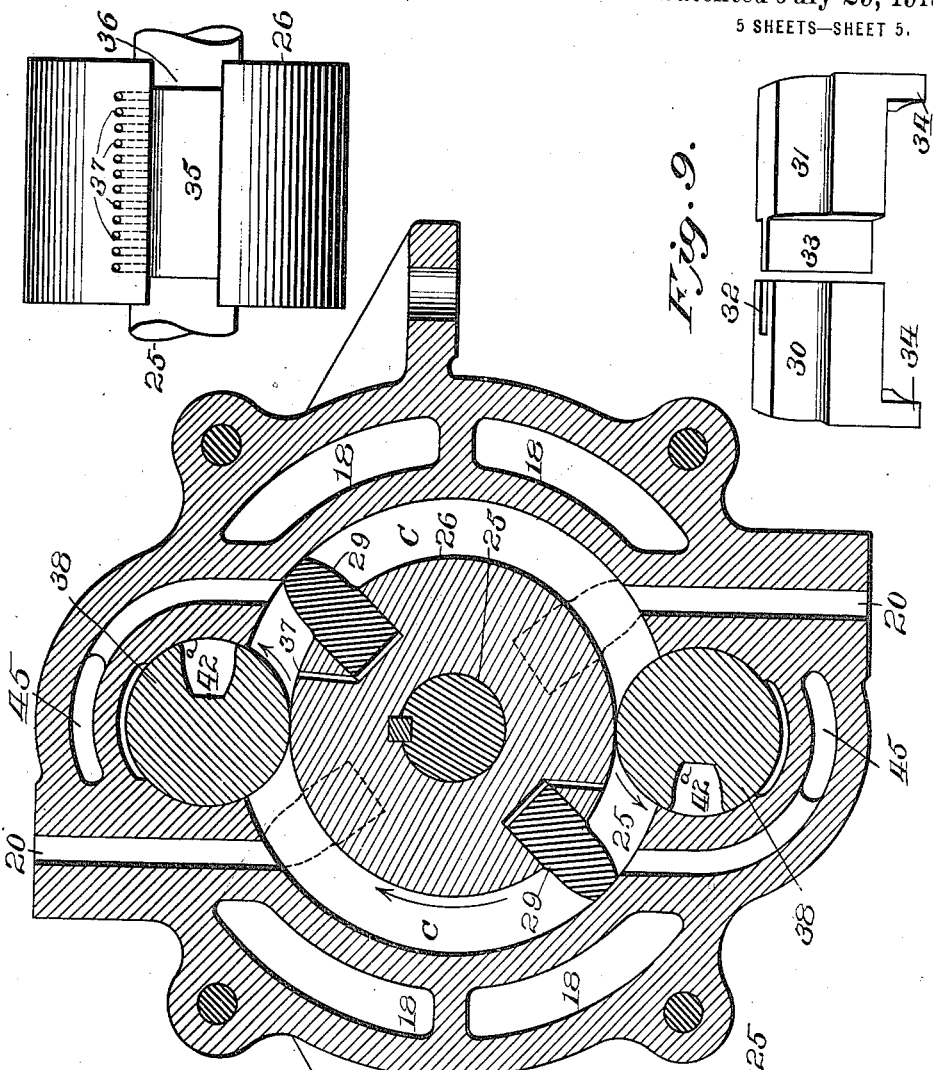

UNITED STATES PATENT OFFICE.

LOUIS G. FISCHER, OF CAMP HILL, PENNSYLVANIA.

ROTARY ENGINE.

1,311,858.      Specification of Letters Patent.      Patented July 29, 1919.

Application filed June 13, 1918. Serial No. 239,823.

*To all whom it may concern:*

Be it known that I, LOUIS G. FISCHER, a citizen of the United States of America, residing at Camp Hill, in the county of Cumberland and State of Pennsylvania, have invented certain new and useful Improvements in Rotary Engines, of which the following is a specification, reference being had therein to the accompanying drawing.

This invention relates to a rotary engine. While its application is quite general, it is especially designed for use as an internal combustion engine.

The invention contemplates among its objects the provision of a rotary motor or engine wherein there will be a plurality of oppositely disposed compression, firing and expansion chambers located along and around a prime mover, the arrangement being such that combustible gases are drawn into and compressed in the first chambers, then carried to and fired within the second chambers and, thence, pass to expansion chambers whence they are exhausted into the atmosphere; each set of these chambers being suitably separated and each chamber having a rotary valve-member passing therethrough and coacting with vanes or paddles on the prime mover and receiving impulsion from the expansion of the gases. The vanes, valves, etc., are mounted upon a driving shaft as units. The arrangement of the various instrumentalities is such that as many units as desired my be added to or taken away from the aggregate.

Still a further object is to provide an engine of this type wherein the casing itself is also made up of a plurality of units, arrangement being made for easy assembling and disassembling of these parts and for the compact housing of bearings for the driving shaft and valves and the timing gears for the valves.

A still further object is to so constitute the structure that the expansion of the gases within the chambers may be utilized to maintain the vanes or paddles in intimate contact with the inner surfaces of the chambers, thus minimizing the likelihood of the loss of power due to leakage of compression.

Other objects and advantages will in part be apparent and in part be brought out more fully in the description which follows.

Drawings are hereto appended disclosing a preferred and practical embodiment of the invention and wherein—

Fig. 2 is a view in longitudinal section thereof;

Figure 1:
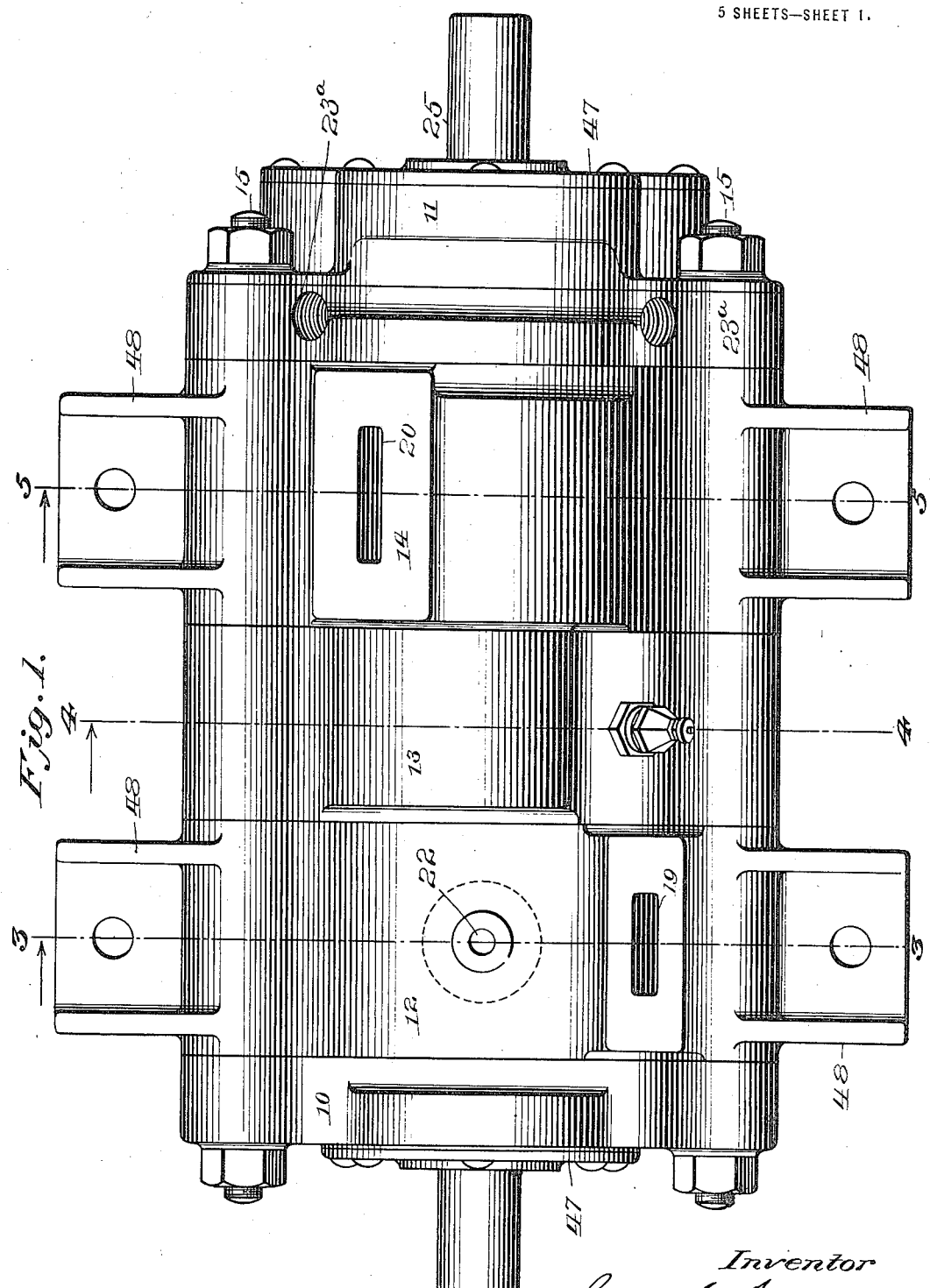
Figure 1 is a view in top plan of the engine.

Figs. 3, 4 and 5 are views in transverse vertical section on the lines 3—3, 4—4, and 5—5, respectively, of Fig. 1;

Figs. 6 and 7 are views in transverse section and top plan, respectively, of a portion of the prime mover;

Fig. 8 is a view similar to Fig. 7, a vane or paddle being removed; and

Fig. 9 is a detail view in perspective of one of the vanes or paddles.

Referring specifically to the drawings, the invention comprises a casing which includes a plurality of components or sections, there being end sections 10 and 11, and intermediate sections 12, 13 and 14. These several sections are suitably secured together, as by bolts 15, the spaces between each intermediate section being provided with a packing 16.

In spaced relation to the outer walls of these casing-sections there is an inner wall 17, and between these walls there are arranged passages 18 for a cooling medium. Extending through the walls are inlet and exhaust passages 19 and 20, respectively, spark-plug openings 21, an oil-duct 22 in communication with a source of lubrication 23, and openings 23$^a$ for a cooling medium.

Mounted in suitable bearings 24 in each end-section of the casing is a drive-shaft 25. Keyed upon this shaft are a plurality of circular disk-members 26 spaced apart by partitions 27. The outer periphery of each of these disk-members is in spaced relation to the inner surface of the inner wall 17 of the casing, the space between these two portions constituting a cylinder-space 28. In the present embodiment, there are three sets of these cylinder-spaces to correspond with the three sets of disk-members on the drive shaft. Each cylinder-space includes two compression-chambers A, two firing chambers B, and two expansion chambers C.

Mounted upon the disk-member in each cylinder-space are oppositely-disposed vanes or paddles 29 of any suitable structure and arrangement, one form of which is disclosed in Figs. 6, 7, 8 and 9. These vanes divide the cylinder-space into two chamber or cylinders. As here shown, each paddle comprises interlocking sections 30 and 31, the former being provided with a groove 32 coacting with a tongue 33 on the latter, and having lugs 34 adapted to embrace the ends of a raised portion 35 disposed in a cutaway section or groove 36 on each disk-member 26. The component parts of the paddle are disposed in this groove 36, and means are provided for forcing the paddles to the limit of their outward movement so that their outer edges will be maintained in intimate contact with the inner wall of the casing. As here shown, such means comprise holes 37 bored from the outer surface of the member 26 into the bottom of the groove 36 so that the expansible gases will be led beneath the paddle and act in the nature of a piston forcing it out into engagement with the inner wall of the casing, and also expanding the sections 30 and 31 against the walls of the partitions.

By the arrangement just described, the paddles or vanes are forced against their confining walls with a pressure proportionate to the amount of pressure being exerted within the cylinder by the expanding gases. This helps materially in minimizing leakage of compression.

Coacting with the paddles and disk-members 26 are two rotary valves 38 extending longitudinally of the casing on opposite sides thereof and suitably housed so that the periphery of these valves will be maintained in intimate contact with the outer surface of the disk-members 26. While I have herein disclosed only two of these valves, obviously there may be more of them. These valves are set in suitable bearings 39 arranged within the end sections of the casing, and are connected, as by gearing 40, with a pinion 41 mounted on the drive-shaft. Suitable packing glands 42 are arranged at the points where the parts of the valve project through the ends of the casing and through the partitions 27, the whole construction making for a compact airtight arrangement wherein the chance of any loss of power due to leakage is reduced to a minimum.

The valves are provided with a cutaway groove 42$^a$ corresponding to the outer contour of the vanes or paddles 29, the groove being adapted to receive the paddles and permit them to rotate in the casing. The drive-shaft, disk-members and the paddles mounted thereon constitute a prime mover which is rotatable as a revolving mass within the casing.

Each valve is likewise provided with a port 43 which leads from the compression-chamber A into the firing-chamber B. A duct 44 connects each chamber B with a channel 45 and this, in turn, communicates with the expansion-chamber C. The compression chamber is in communication, through its inlet-port, with a carbureter or the like (not shown).

The operation of the motor is as follows:—

When the vanes or paddles in the compression chamber, (see Fig. 3), pass the intake ports they draw a charge of gaseous mixture in behind them. As the second paddle passes this port it presses this charge against the valve 38. This compression continues until the valve moves just beyond the position shown in Fig. 3 when the duct 43 is uncovered and carries the charge across into the firing chamber which is the next chamber to the right, where it is compressed until it reaches the position shown in Fig. 4 where it is fired. The paddles are then driven forward until they pass the ducts 44 whence the products of combustion are carried through the channels 45 into the next chambers at the extreme right as shown in Fig. 5. Here they are further expanded until the paddle passes ports 20 whence they are finally exhausted to the atmosphere. The function of the expansion-chamber is to make use of the power which is now generally wasted in the muffler and at the same time expand the exploded charge to such an extent as to make it practically noiseless. The valves are timed so that two distinct explosions take place at every one-half revolution of the main driving shaft or four explosions at every revolution, one explosion in each chamber formed by the two rotary valves.

Easy access is permitted to the bearings and gearing by means of end plates 47 which also maintain the structures housed therein dustproof. Suitable means for supporting the motor are also provided and as here shown they comprise lugs or the like 48.

From the foregoing it will be apparent that the present invention provides a neat, compact, and effective means for performing the functions and producing the objects above enumerated. While it has been disclosed in the embodiment herein set forth, it will be understood that many changes may be made in the general construction and arrangement of the parts without departing from the spirit of the invention nor sacrificing its advantages, particularly within the scope as set forth in the claims.

What I claim is:—

1. A rotary engine comprising a plurality of connected sections constituting a casing; a driving shaft mounted therein; a plurality of disk-members in spaced relation mounted upon said driving shaft; partitions separating said disk-members and dividing said casing into a plurality of chambers; oppositely-disposed paddles arranged on said circular disk-members and dividing the chambers into compartments; valve members rotatably mounted within said casing and having a portion bearing upon the surface of the circular disk-members, each valve being provided with slotted portions for the reception of the paddles, and with a duct leading from one chamber into the next succeeding chamber; and means for connecting the valves and the driving shaft.

2. A rotary engine comprising a plurality of connected sections constituting a casing; a driving shaft mounted therein, a plurality of circular disk-members in spaced relation mounted upon said driving shaft; partitions separating said circular disk-members and dividing said casing into a plurality of chambers; oppositely-disposed paddles arranged on said circular disk-members and dividing the chambers into compartments; valve members rotatably mounted within said casing and having a portion bearing upon the surface of the circular disk-members, each valve being provided with slotted portions for the reception of the paddles, and with a duct leading from one chamber into the next succeeding chamber; means for connecting the valves and the driving shaft; and means for compressing a charge within one of the cylinders and leading the compressed charge into another of the cylinders.

3. A rotary engine comprising a plurality of connected sections constituting a casing; a driving shaft mounted therein, a plurality of circular disk-members in spaced relation mounted upon said driving shaft; partitions dividing said circular disk-members and said casing into a plurality of chambers; oppositely-disposed paddles arranged on said circular disk-members and dividing the chambers into compartments; valve members rotatably mounted within said casing and having a portion bearing upon the surface of the circular disk-members, each valve being provided with slotted portions for the reception of the paddles, and with a duct leading from one chamber into the next succeeding chamber; means for connecting the valves and the driving shaft; means for compressing a charge within one of the cylinders and leading the compressed charge into another of the cylinders; means for firing the compressed charge in said cylinder; and means for leading the exploded charge into an expansion cylinder.

4. A rotary engine comprising a casing; a driving shaft mounted therein; partitions dividing the casing into a compression chamber; a firing chamber and an expansion chamber arranged axially on the shaft; paddle members associated with the shaft and dividing each chamber into compartments; valve members rotatably mounted within the casing, the valves being provided with recesses for the paddles and with passages connecting the compression and firing chambers; and means for driving the valves and shaft in synchronism.

In testimony whereof I affix my signature in presence of two witnesses.

LOUIS G. FISCHER.

Witnesses:
 ROBERT B. THOMPSON,
 RAGNAR HALLGREN.